April 30, 1940.    A. CECCHET    2,199,040
CONTROL VALVE FOR GAS CONTAINERS
Filed Dec. 30, 1937    2 Sheets-Sheet 1

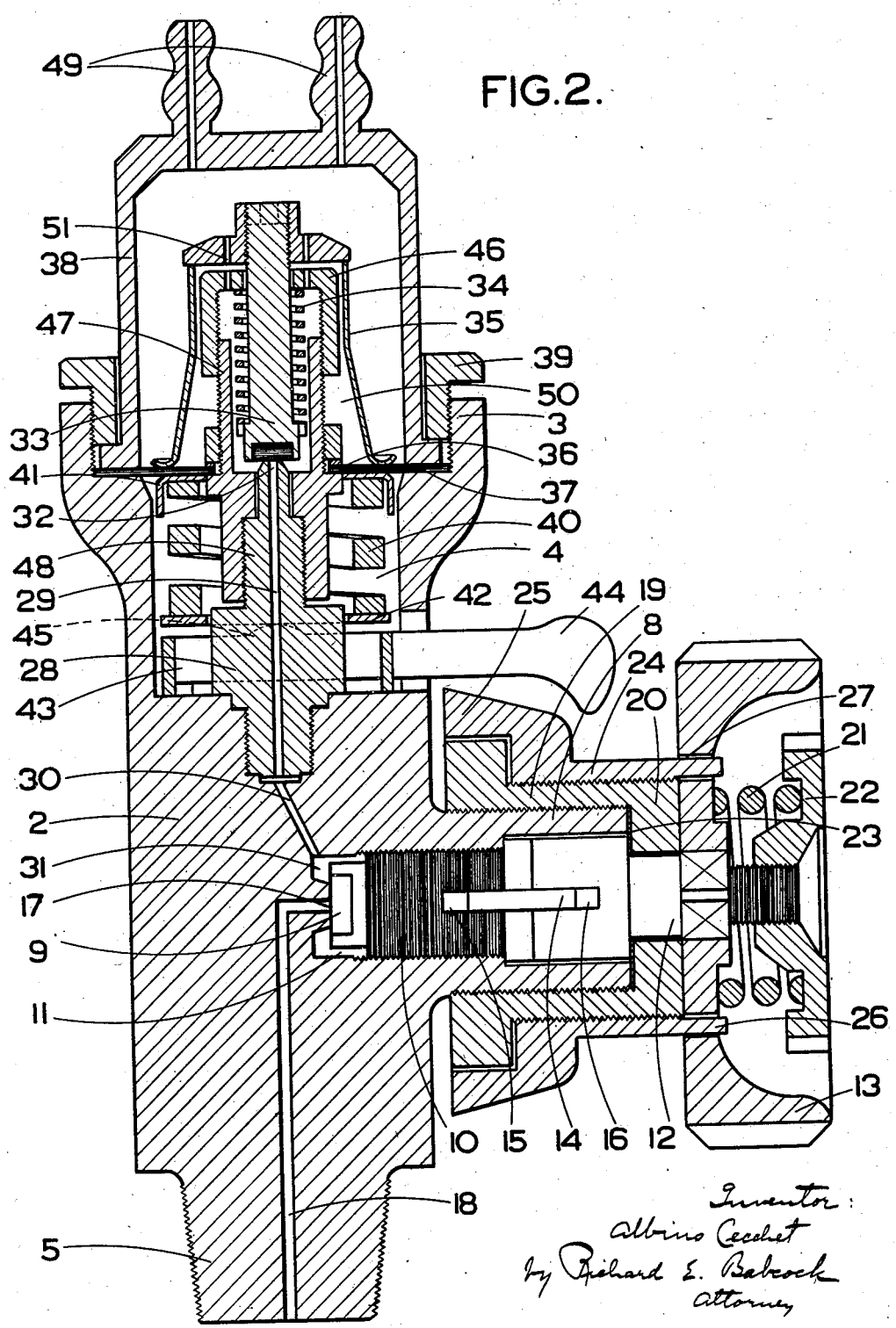

Patented Apr. 30, 1940

2,199,040

UNITED STATES PATENT OFFICE 2,199,040

CONTROL VALVE FOR GAS CONTAINERS

Albino Cecchet, Brescia, Italy

Application December 30, 1937, Serial No. 182,580

8 Claims. (Cl. 277—26)

This invention relates to apparatus for charging and discharging containers for compressed gases or gas-charged liquids, of the kind described in my British Patent No. 461,044. That is to say, the improved apparatus is of the single-control kind comprising a stop valve, a combined pressure reducing and safety valve and means whereby the pressure of discharge is automatically maintained constant.

The object of the present invention is to provide an improved construction of apparatus of the kind referred to, in which the operation of the stop valve for discharging purposes automatically opens the pressure reducing and safety valve.

In the accompanying drawings—

Figure 2 is a central longitudinal sectional view thereof on line II—II of Figure 1.

Figure 1:
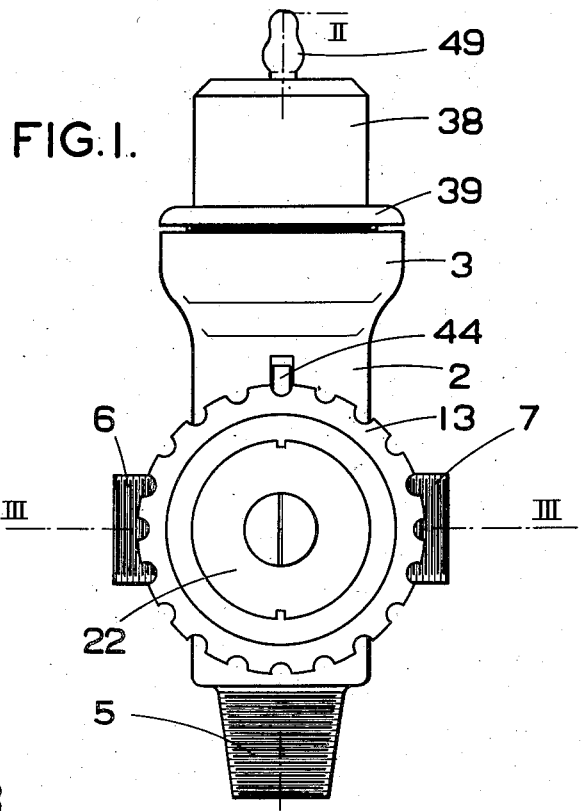
Figure 1 is a front elevational view of the improved device.
Figure 3:
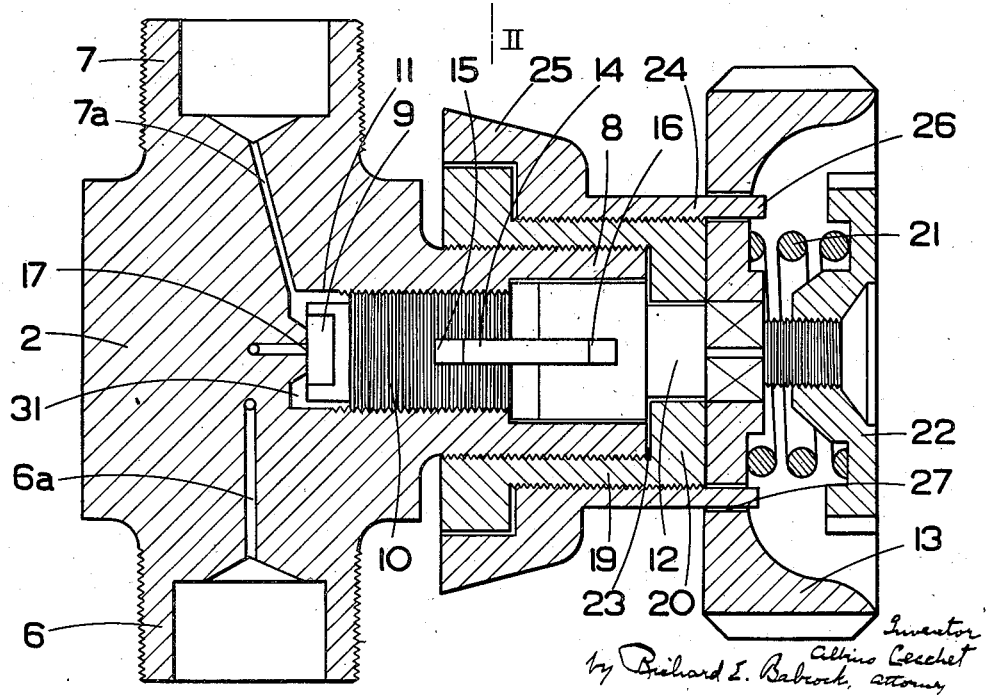
Figure 3 is a transverse sectional view through the stop valve on line III—III of Figure 1.

The cylindrical body 2 of the device is of massive proportions to withstand the high pressures with which it is intended to deal and is made of a metal or alloy which will resist the chemical action of the gases or liquids passing through it.

The said body is recessed at its upper end to form a stuffing box 3 and a cavity 4 for the reception of the reducing valve mechanism hereinafter described, and is also formed with four externally screw-threaded bosses one, 5, of which is for attachment to the container to be discharged or to a source of compressed gases or gas-charged liquid, another 6, for connection with a container to be charged, a third, 7, for the attachment of a pressure gauge, not shown, and a fourth, 8, for the reception of the stop valve 9 and its operating means.

The said stop valve 9 is carried by a plug 10 screwing into the tapped inner end of a hole 11 in the boss 8. The said plug is adapted to be rotated to open and close the stop valve by means of a short spindle 12, having a squared portion to receive a hand wheel 13. The said spindle, which is free to rotate but not to move in an axial direction, is coupled to the plug 10 by means of a blade 14 each end of which has a sliding engagement in slots 15, 16 formed for the purpose in the opposing ends of the plug 10 and enlarged inner end of the spindle 12 respectively. It will be seen therefore that rotation of the said spindle in either direction will cause the screwed plug 10 to move axially into and out of its operative position with respect to the orifice 17, communicating with the passage 18 in the boss 5.

Screwing onto the outside of the boss 8 is a gland 19, the inwardly flanged outer end 20 of which forms an abutment for the enlarged inner end of the spindle 12. The said spindle is urged outwardly by a spring 21 which takes a bearing at one end against a disc nut 22 screwing onto the outer end of the spindle 12 and at the other end against the hand wheel 13 which itself abuts against the outer end of the gland 19. A gastight joint between the said spindle and gland is maintained by means of packing 23 of any suitable material.

Screwing onto the outside of the said gland 19 is a sleeve 24 the inner end of which is formed with a conical part 25 whilst its outer end is formed with lugs or projections 26 adapted to engage slots 27 in the hand wheel 13.

The pressure reducing and safety valve mechanism which, as aforesaid, is carried by the upper part of the body 2, comprises a plug 28 screwing into the bottom of the cavity 4 in the body and having a bore 29 communicating by the duct 30 with a space 31 around the stop valve 9. The orifice 32 at the upper end of the bore in the said plug 28 is controlled by the pressure reducing and safety valve 33 which is normally closed by a spring 34 and is carried by the upper end of a cap 35. This cap is supported at its lower end by means of a diaphragm 36 the marginal edge of which is firmly clamped with a gas-tight joint between a shoulder 37 in the cavity 4 and the lower end of a casing 38 by means of a gland 39 screwing into the stuffing box 3 in the body 2. The diaphragm 36 is supported by a strong spring 40 the upper end of which abuts against a flanged washer 41 at the underside of the diaphragm while its lower end bears upon a washer 42. The latter washer is itself supported by the inner end 43 of a lever 44 loosely surrounding the plug 28 at the bottom of the cavity 4 and formed at each side of the centre with raised portions 45 on which the washer 42 bears. The outer end of the lever is formed with a depending enlargement or finger or cam as shown for engagement by the conical portion 25 of the sleeve 24. The upper end of the valve 33 is guided by a sleeve 46 screwing onto the outside of a tubular extension 47 of a plug 48 which supports the inner edge of the diaphragm and is carried by the upper part of the plug 28.

The upper end of the casing 38 is closed and formed with delivery nozzles 49.

When the stop valve is closed there is as shown in Figure 2, a certain clearance between the lever 44 and the coned part 25 of the sleeve 24 so that the stop valve 9 can be opened without opening the pressure reducing and safety valve 33.

In using the improved apparatus for charging purposes the boss 5 is connected with a source of supply of compressed gas or gas-charged liquid while the container to be charged is placed in communication with the boss 6 and a pressure gauge is fitted to the boss 7 the bore 7ᵃ of which communicates with the small space 31. The hand wheel 13 is now turned to an extent sufficient to open the stop valve 9 without operating the lever 44. This places the container to be charged at 6 in communication with the source of supply at 5 through the passages 18 and 6ᵃ the inner ends of which communicate with each other. When the desired pressure has been obtained in the container as indicated by the gauge at 7 the hand wheel is rotated in the reverse direction to close the stop valve 9. The charged container which will be provided with its own closing cock will then be disconnected from its boss and the latter connected with another container to be charged.

If now it is desired to use the improved apparatus for discharging purposes the bosses 6 and 7 are closed by plugs provided for the purpose as parts of the equipment and a container of compressed gas or gas-charged liquid is connected with the boss 5 and its cock opened. The hand wheel 13 is then rotated to open the stop valve 9 and the rotation continued until the coned part 25 of the sleeve 24 contacts with and raises the lever 44 against the action of the spring 40. The increased pressure of the spring raises the diaphragm 36 which in turn raises the cap 35 and opens the reducing valve 33 against the pressure of the lighter spring 34. The stop valve being open, the compressed gas or gas-charged liquid from the charged container issues from the orifice 32 into the space 50 and thence through the orifices 51 at the top of the cap 35 into the interior of the casing 38 and eventually passes out at the required reduced pressure through the nozzles 49 to wherever it is required.

It will be understood that at the commencement of the discharge from the container the pressure of the gas or gas-charged liquid therein is at its maximum and will tend to build up a counter-pressure in the casing 38 and space 50 which counter-pressure acts on the diaphragm 36 in a direction, assisted by the spring 34, to close the reducing valve 33. As the pressure falls in the container this counter pressure also falls and in consequence the reducing valve is raised under the sustained pressure of the spring 40 acting at the other side of the diaphragm. In this way the pressure of discharge at the nozzle is automatically maintained constant, the relative strengths of the two springs 34 and 40 being carefully selected to obtain this result. There is therefore no necessity, as hitherto, to adjust the stop valve as the pressure falls in the container.

I claim:

1. Apparatus of the kind and for the purposes described comprising a body adapted for connection with a source of supply of compressed gas or gas-charged liquid and having a delivery orifice, a stop valve and a pressure reducing and safety valve mounted in said body and adapted to control said supply and delivery respectively, means for operating the stop valve, a lever mounted in said body adapted to open said pressure reducing and safety valve, a positive mechanical interlock between said means and said lever whereby operation of said means to open said stop valve causes movement of said lever to open said pressure reducing and safety valve and mechanism whereby the pressure of delivery of the gas or gas charged liquid is automatically maintained constant.

2. Apparatus of the kind and for the purposes described comprising a body having a bore adapted for connection with a source of supply of compressed gas or gas-charged liquid and a delivery orifice, a stop valve controlling said supply to said bore, means for operating said valve, a pressure reducing and safety valve controlling said delivery orifice, a casing enclosing said pressure reducing and safety valve, a flexible diaphragm arranged between said casing and said body and carrying said pressure reducing and safety valve, a spring normally tending to close the latter valve, a spring acting on the diaphragm and tending to open said latter valve, a lever mounted in said body and acting on said latter spring, and a cone associated with said stop valve and adapted to operate said lever to open the said pressure reducing and safety valve.

3. A valve device comprising a body formed with an inlet passage, a discharge passage, a chamber in communication with said discharge passage, and a valve bore, said inlet passage and outlet passages leading to and from said valve bore and being adapted to be in communication with each other through a portion of said valve bore, said discharge passage leading from said valve bore to said chamber, and said chamber being formed with a discharge orifice, in combination with a stop valve disposed in said valve bore and said stop valve being operable to prevent communication between said passages, a discharge valve disposed in said chamber and normally closing the discharge orifice of said discharge passage, a pressure responsive device disposed in said chamber governing the position of said discharge valve when open, mechanical displacement means for opening said discharge valve, and a single operating means mechanically engaging said stop valve and said displacement means for causing the opening of both of said valves by continued movement in one direction and for causing the closing of the stop valve and permitting the closing of the discharge valve by continued movement in the reverse direction.

4. A valve device comprising a body formed with an inlet passage, a discharge passage, a chamber in communication with said discharge passage, and a valve bore, said inlet passage and outlet passages leading to and from said valve bore and being adapted to be in communication with each other through a portion of said valve bore, said discharge passage leading from said valve bore to said chamber, and said chamber being formed with a discharge orifice, in combination with a stop valve disposed in said bore and being operable to prevent communication between said passages, a discharge valve disposed in said chamber and normally closing the discharge orifice of said discharge passage, a spring opposed diaphragm disposed in said chamber governing the position of said discharge valve when open, mechanical displacement means for opening said discharge valve, and a single operating means mechanically engaging said stop valve and said displacement means for causing the opening of both of said valves by continued movement in one direction and for causing the closing of the stop valve and permitting the closing of the discharge valve by continued movement in the reverse direction.

5. A valve device comprising a body formed with an inlet passage, a discharge passage, a chamber in communication with said discharge passage, and a valve bore, said inlet passage and outlet passages leading to and from said valve bore and being adapted to be in communication with each other through a portion of said valve bore, said discharge passage leading from said valve bore to said chamber, and said chamber being formed with a discharge orifice, in combination with a stop valve disposed in said bore, a valve disposed in said chamber and normally closing the discharge orifice of said discharge passage, a pressure responsive device disposed in said chamber governing the position of said discharge valve when open, mechanical displacement means for opening said discharge valve, and a single operating means mechanically engaging said stop valve and said displacement means for causing the opening of both of said valves by continued movement in one direction and for causing the closing of the stop valve and permitting the closing of the discharge valve by continued movement in the reverse direction.

6. A pressure regulator comprising a body formed with a chamber and with a clamping shoulder surrounding the open end of said chamber, a cavitied cap, a tubular fitting device having an anchored internally screw-threaded portion externally formed with a clamping collar disposed substantially in the same plane as said clamping shoulder and a free end portion externally screw-threaded and formed with a large axial bore to constitute a working barrel and being in communication with said internally screw-threaded portion, a ring-shaped diaphragm receiving said free end portion of said tubular fitting in its central opening and having its inner peripheral portion resting on the upper face of said clamping collar, means for clamping the outer peripheral portion of said diaphragm between said clamping shoulder and the opposed edge face of said cap, and a ring having screw-thread engagement with the exterior of said tubular fitting and clamping the inner peripheral portion of said diaphragm between it and said clamping collar, said body being formed with an inlet passage and said cap being formed with an outlet passage, in combination with a plug screwed into the bottom wall of said chamber and having the internally screw-threaded portion of said tubular fitting screwed on its upper end, said plug having an axial bore in communication with said inlet passage, a safety and pressure reducing valve member having a head disposed in said barrel and adapted to engage the upper end of said plug to close said bore and provided with a reduced diameter stem extending up beyond the end of said barrel, an internally screw-threaded internally flanged collar screwed on the upper end of said tubular fitting and functioning with the inner face of its flange to guide said stem, a secondary helical spring disposed about said stem with its lower end bearing against said valve head and its upper end bearing against said flange and adjustable in compression by the adjustment of said collar on said tubular fitting, a presser member bearing with its lower face on the upper face of said diaphragm and positively connected with said stem above said collar to move said stem and the valve head in accordance with the deformation of said diaphragm, a lever disposed about said plug in contact with the lower wall of said chamber to be rocked relative to said wall and extending laterally from said body, a plate disposed about said plug and engaging the upper face of said lever, a cupped member engaging the lower face of said diaphragm, and a primary helical spring disposed about said plug and the internally screw-threaded portion of said tubular fitting with its upper end received in said cupped member and its lower end bearing against said plate and being of greater strength than said secondary spring.

7. A pressure regulator comprising a body formed with a chamber and with a clamping shoulder surrounding the open end of said chamber, a cavitied cap, a tubular fitting having an anchored lower portion externally formed with a clamping collar disposed substantially in the same plane as said clamping shoulder and a free end portion, a ring shaped diaphragm receiving said free end portion of said tubular fitting in its central opening and having its inner peripheral portion resting on the upper face of said clamping collar, means for clamping the outer peripheral portion of said diaphragm between said clamping shoulder and the opposed edge face of said cap, and means for clamping the inner peripheral portion of said diaphragm against said clamping collar, said body being formed with an inlet passage and said cap being formed with an outlet passage, in combination with a plug secured in the bottom wall of said chamber and having the lower portion of said tubular fitting secured on its upper end, said plug having an axial bore in communication with said inlet passage, a safety and pressure reducing valve member having a head to engage the upper end of said plug to close said bore and provided with a stem, a collar secured on the upper end of said tubular fitting, a secondary helical spring disposed about said stem with its lower end bearing against said valve head and its upper end bearing against said collar, a presser member bearing with its lower face on the upper face of said diaphragm and positively connected with said stem to move said stem and the valve head, a lever in contact with the lower wall of said chamber to be rocked relative to said wall and extending laterally from said body, a plate engaging the upper face of said lever, a saddle engaging the lower face of said diaphragm, and a primary helical spring disposed about said plug with its upper end engaging said saddle and its lower end bearing against said plate and being of greater strength than said secondary spring.

8. A pressure regulator comprising a body formed with a chamber, a cavitied cap, a tubular fitting having an anchored lower portion and an upper supporting portion, a ring shaped diaphragm receiving said supporting portion of said tubular fitting in its central opening, means for clamping the outer peripheral portions of said diaphragm to make a gas tight joint between said portions and said clamping means, said body being formed with an inlet passage and said cap being formed with an outlet passage in combination with a plug secured into the bottom wall of said chamber and having the lower portion of said tubular fitting secured on its upper end, said plug having an axial bore in communication with said inlet passage, a safety and pressure reducing valve member having a head to engage the upper end of said plug to close said bore and provided with a stem, a collar secured on the upper end of said tubular fitting, a secondary helical spring disposed about said stem with its lower end bearing against said valve head and its upper end bearing against said collar, a presser member bearing with its lower face on the upper face of said diaphragm and positively connected with said stem, a lever in contact with the lower wall of said chamber to be rocked relative to said wall and extending laterally from said body, a plate engaging the upper face of said lever, a saddle member engaging the lower face of said diaphragm, and a primary helical spring disposed about said plug with its upper end engaging said saddle and its lower end bearing against said plate and being of greater strength than said secondary spring.

CECCHET, ALBINO.